2,989,532
α-[3-(1,2,3,4-TETRAHYDROISOQUINOLYL)]-BENZHYDROL AND SALTS THEREOF

Leslie G. Humber and Stanley O. Winthrop, Montreal, Quebec, Canada, assignors to American Home Products Corporation, New York, N.Y., a corporation of Delaware
No Drawing. Filed June 19, 1959, Ser. No. 821,368
3 Claims. (Cl. 260—289)

This invention relates to a new chemical compound, α-[3-(1,2,3,4-tetrahydroisoquinolyl)]-benzhydrol, and to hydrohalide salts thereof. It is also concerned with a process by which these compounds may be prepared.

Our new chemical compounds, α-[3-(1,2,3,4-tetrahydroisoquinolyl)]-benzhydrol and its hydrohalide salts, particularly the hydrochloride salt, are useful as central nervous system stimulants.

The compound, α-[3-(1,2,3,4-tetrahydroisoquinolyl)]-benzhydrol, may be readily prepared by reacting 3-carbethoxy-1,2,3,4-tetrahydroisoquinoline with a Grignard reagent such as phenyl magnesium bromide. More particularly, we prefer to react the hydrochloride salt of 3-carbethoxy-1,2,3,4-tetrahydroisoquinoline with phenyl magnesium bromide in an ethereal solution.

The starting material, 3-carbethoxy-1,2,3,4-tetrahydroisoquinoline, and its hydrochloride salt, may be readily prepared by procedures which are described in the chemical literature; see: Swan, Journal of the Chemical Society (London), 1946, page 617.

Ordinarily we first prepare 3-carbethoxy-1,2,3,4-tetrahydroisoquinoline by a procedure such as that described by Swan, and then convert it to its hydrochloride salt, before converting the latter to the desired new compound, α-[3-(1,2,3,4-tetrahydroisoquinolyl)]-benzhydrol, by the use of the Grignard reagent.

These chemical changes may be diagrammatically indicated as follows:

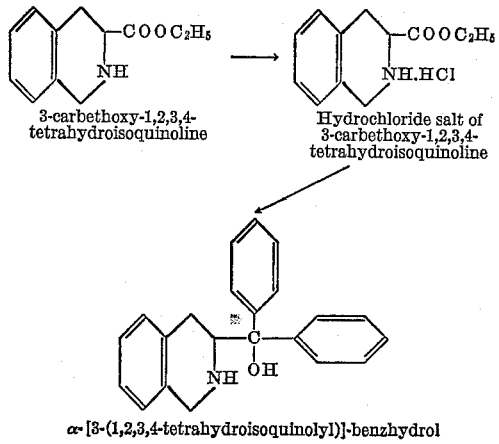

α-[3-(1,2,3,4-tetrahydroisoquinolyl)]-benzhydrol

Example 4.7 grams (0.023 mole) of 3-carbethoxy-1,2,3,4-tetrahydroisoquinoline hydrochloride was prepared from 3-carbethoxy-1,2,3,4-tetrahydroisoquinoline by treating the latter with ethereal hydrogen chloride.

The resulting solid hydrochloride was then added slowly to an ethereal solution of 0.28 mole of phenyl magnesium bromide. The mixture was refluxed for 3 hours, and then allowed to stand at room temperature for 15 hours.

A 20 percent solution of aqueous ammonium chloride was then added to the reaction mixture in order to decompose the intermediate reaction product. Benzene was then added and a benzene-ether extract secured. This extract was then removed, washed with water, and dried over sodium sulfate. It was then evaporated to dryness in vacuo, i.e. at a pressure less than atmospheric, and there were thus obtained 6.6 grams of α-[3-(1,2,3,4-tetrahydroisoquinolyl)]-benzhydrol.

The product was twice crystallized from ethanol solution and, after purification, it had a melting point of 169–170° C. Analysis confirmed the empiric formula $C_{22}H_{21}NO$.

Calculated: C, 83.80; H, 6.71. Found: C, 83.80; H, 6.89.

An ethanolic solution of hydrogen chloride was then added to a small amount of the α-[3-(1,2,3,4-tetrahydroisoquinolyl)]-benzhydrol product and there was thus obtained α-[3-(1,2,3,4-tetrahydroisoquinolyl)]-benzhydrol hydrochloride. This salt crystallized from absolute ethanol as colorless crystals having a melting point in excess of 250° C. Analysis confirmed the empiric formula $C_{22}H_{22}NOCl$.

Calculated: N, 3.98; Cl, 10.08. Found: N, 3.95; Cl, 10.02.

Other hydrohalide salts may be prepared in a similar manner.

We claim:
1. A compound selected from the group which consists of α-[3-(1,2,3,4-tetrahydroisoquinolyl)]-benzhydrol and its hydrohalide salts.
2. α-[3-(1,2,3,4-tetrahydroisoquinolyl)]-benzhydrol.
3. α-[3-(1,2,3,4-tetrahydroisoquinolyl)]-benzhydrol hydrochloride.

References Cited in the file of this patent

Remfry et al.: Berichte Deutsche Chemische Gessellschaft, vol. 41, pp. 1007–9 (1908).
Dyson et al.: Journal Chemical Society (London) (1937), page 1724.
Ashworth et al.: Journal Chemical Society (London), pages 809 812 (1939).